(12) United States Patent
Osaka

(10) Patent No.: US 8,138,737 B2
(45) Date of Patent: Mar. 20, 2012

(54) DUTY CYCLE CONTROLLER FOR POWER FACTOR CORRECTION CIRCUIT

(75) Inventor: Shohei Osaka, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 233 days.

(21) Appl. No.: 12/428,587

(22) Filed: Apr. 23, 2009

(65) Prior Publication Data

US 2009/0290395 A1    Nov. 26, 2009

(30) Foreign Application Priority Data

May 22, 2008   (JP) ................ 2008-134539

(51) Int. Cl.
*G05F 1/00*    (2006.01)
*G05F 3/16*    (2006.01)

(52) U.S. Cl. .............. 323/285; 323/223; 323/224

(58) Field of Classification Search ........ 323/222–224, 323/282, 285
See application file for complete search history.

(56) References Cited

U.S. PATENT DOCUMENTS

| | | | | |
|---|---|---|---|---|
| 6,388,429 B1* | 5/2002 | Mao | ................ | 323/222 |
| 6,448,745 B1 | 9/2002 | Killat | | |
| 2003/0222633 A1* | 12/2003 | Hwang | ................ | 323/282 |
| 2005/0207193 A1* | 9/2005 | Adragna | ................ | 363/89 |
| 2006/0261746 A1* | 11/2006 | Huang et al. | ................ | 315/209 R |
| 2007/0008756 A1* | 1/2007 | Djenguerian et al. | ......... | 363/95 |
| 2007/0145956 A1* | 6/2007 | Takeuchi | ................ | 323/207 |

FOREIGN PATENT DOCUMENTS

JP    2000340383 A    * 12/2000

OTHER PUBLICATIONS

U.S. Appl. No. 12/598,045, filed Oct. 29, 2009, Osaka.

* cited by examiner

*Primary Examiner* — Adolf Berhane
*Assistant Examiner* — Jeffrey Gblende
(74) *Attorney, Agent, or Firm* — Oblon, Spivak, McClelland, Maier & Neustadt, L.L.P.

(57) ABSTRACT

A power factor correction circuit includes a first rectifier to rectify an AC voltage, a series circuit connected to an output of the first rectifier and including a step-up reactor and a switching element, a rectifying-smoothing circuit connected to both ends of the switching element and including a second rectifier and a smoothing capacitor, an input voltage detector to detect an output voltage of the first rectifier, an output voltage detector to detect a voltage across the smoothing capacitor, an error amplifier to amplify an error between the output voltage signal and a reference voltage, and a controller to determine an ON/OFF duty ratio of the switching element according to the amplified error signal and a result of a calculation carried out on the input voltage signal and output voltage signal.

6 Claims, 8 Drawing Sheets

DUTY CYCLE CONTROLLER FOR POWER FACTOR CORRECTION CIRCUIT

BACKGROUND OF THE INVENTION

1. Field of the Invention

The present invention relates to a technique of controlling a power factor correction circuit.

2. Description of the Related Art

FIG. 1 is a circuit diagram illustrating a power factor correction circuit according to a first related art. This power factor correction circuit is with a current-critical, step-up DC/DC converter.

In FIG. 1, a first rectifier RC1 rectifies and converts an AC voltage of an AC power source Vin into a DC voltage. An output of the first rectifier RC1 is connected to a series circuit including a first winding N1 of a step-up transformer T1, a switching element Q1 made of an n-type MOSFET, and a resistor R5. A series circuit of the switching element Q1 and resistor R5 is connected in parallel with a rectifying-smoothing circuit including a second rectifier D1 and a smoothing capacitor C1. Both ends of the first rectifier RC1 are connected to a series circuit of resistors R1 and R2. Both ends of the smoothing capacitor C1 are connected to a series circuit of resistors R3 and R4.

The series circuit of resistors R1 and R2 forms an input voltage detector detecting an output voltage from the first rectifier RC1 according to a divided voltage provided by the resistors R1 and R2 and outputting a divided input voltage signal Vvin to a multiplier 17.

A controller 100 controls an ON/OFF operation of the switching element Q1 and includes an error amplifier 14, the multiplier 17, comparators CMP3 and CMP4, and a flip-flop FF2.

The error amplifier 14 amplifies an error between a reference voltage Vref (not illustrated) and a divided voltage signal that is obtained by dividing a voltage across the smoothing capacitor C1 by the resistors R3 and R4. The error amplifier 14 outputs the amplified error as an amplified error signal Vcmp to the multiplier 17. The multiplier 17 multiplies the divided input voltage signal Vvin by the amplified error signal Vcmp and outputs the product to an inverting input terminal (as depicted by "−") of the comparator CMP3.

The resistor R5 acts as a current detector to detect a current passing through the switching element Q1. The comparator CMP3 compares the current Vid detected by the resistor R5 with the product of "Vvin×Vcmp" from the multiplier 17. A result of the comparison from the comparator CMP3 is supplied to a reset terminal of the flip-flop FF2 and the flip-flop FF2 determines an ON period of the switching element Q1.

FIG. 2 illustrates a control operation carried out by the first related art of FIG. 1. An ON period of the switching element Q1 is a period in which the current signal Vid detected by the resistor R5 increases from zero to the product of "Vcmp× Vvin" where Vcmp is the amplified error signal and Vvin is the divided input voltage signal.

The comparator CMP4 compares a voltage of a second winding N2 of the step-up transformer T1 with a reference voltage E1. A result of the comparison is supplied to a set terminal S of the flip-flop FF2. A period in which the voltage of the second winding N2 of the step-up transformer T1 is high defines an OFF period of the switching element Q1.

FIG. 3 illustrates a converter according to a second related art disclosed in U.S. Pat. No. 6,448,745. In the converter, an input voltage U1 is divided by resistors Z11 and Z12 to provide a divided input voltage. An output voltage Uc is divided by resistors Z41 and Z42 to provide a divided output voltage. The divided input voltage, the divided output voltage, and a reference voltage 202 are converted into digital signals by an A/D converter 203. Just after an occurrence of a zero-current state, a digital controller 204 restarts charging a cumulative inductor according to the digitally converted divided input voltage and divided output voltage and an ON time of a shunt switch S.

The digital controller 204 minutely adjusts a pulse width for the shunt switch S, thereby minutely adjusting energy that is conducted according to a result of comparison between an output voltage Uc and a reference voltage.

SUMMARY OF THE INVENTION

The power factor correction circuit of the first related art illustrated in FIG. 1 should employ the second winding N2 that is an auxiliary winding of the transformer T1. The auxiliary winding increases the size of the circuit and has a risk of causing an abnormal state such as short-circuited. To reduce the risk, the first related art must take some measure that may increase the cost of the circuit.

The second related art illustrated in FIG. 3 should employ the A/D converter 203 and digital controller 204 that increase the cost of the circuit. Since the second related art employs digital signals, it must discretely hold an ON time and calculate an OFF time according to the ON time and an input voltage. If the input voltage suddenly changes due to external noise and the like, such a discrete technique is unable to calculate an OFF time in response to the sudden change in the input voltage. This may cause an error in the OFF time with respect to the sudden change in the input voltage.

The present invention provides a power factor correction circuit capable of detecting an input voltage and an output voltage and arithmetically finding a critical point where a current passing through a step-up reactor becomes zero without an auxiliary winding, thereby reducing the cost of the circuit and improving the safety of the circuit.

According to a first aspect of the present invention, the power factor correction circuit includes a first rectifier configured to rectify and convert an AC voltage into a DC voltage; a series circuit connected to an output of the first rectifier and including a step-up reactor and a switching element; a rectifying-smoothing circuit connected to both ends of the switching element and including a second rectifier and a smoothing capacitor; an input voltage detector configured to detect an output voltage of the first rectifier and provide an input voltage signal representing the detected voltage; an output voltage detector configured to detect a voltage across the smoothing capacitor and provide an output voltage signal representing the detected voltage; an error amplifier configured to amplify an error between the output voltage signal and a reference voltage and provide an amplified error signal; and a controller configured to determine an ON/OFF duty ratio of the switching element according to the amplified error signal and a result of a calculation carried out on the input voltage signal and output voltage signal.

According to a second aspect of the present invention, the controller of the first aspect includes an operation unit configured to provide the result of the calculation carried out on the input voltage signal and output voltage signal and a signal generator configured to set an ON time of the switching element in proportion to the amplified error signal, set an OFF time of the switching element based on a comparison between the result of the calculation and the amplified error signal, and provide a pulse string signal specifying the set ON time and OFF time.

According to a third aspect of the present invention, the controller of the first aspect includes an operation unit configured to provide the result of the calculation carried out on the input voltage signal and the amplified error signal and a signal generator configured to provide a pulse string signal specifying an ON time and an OFF time of the switching element, wherein the ON time is set based on a comparison between an integrated value of the input voltage signal and the result of the calculation, and the OFF time is set based on a comparison between the result of the calculation and an integrated value of differences between the output voltage signal and the input voltage signal.

DESCRIPTION OF THE PREFERRED EMBODIMENT

Power factor correction circuits according to embodiments of the present invention will be explained in detail with reference to the drawings.

Embodiment 1

Figure 4:
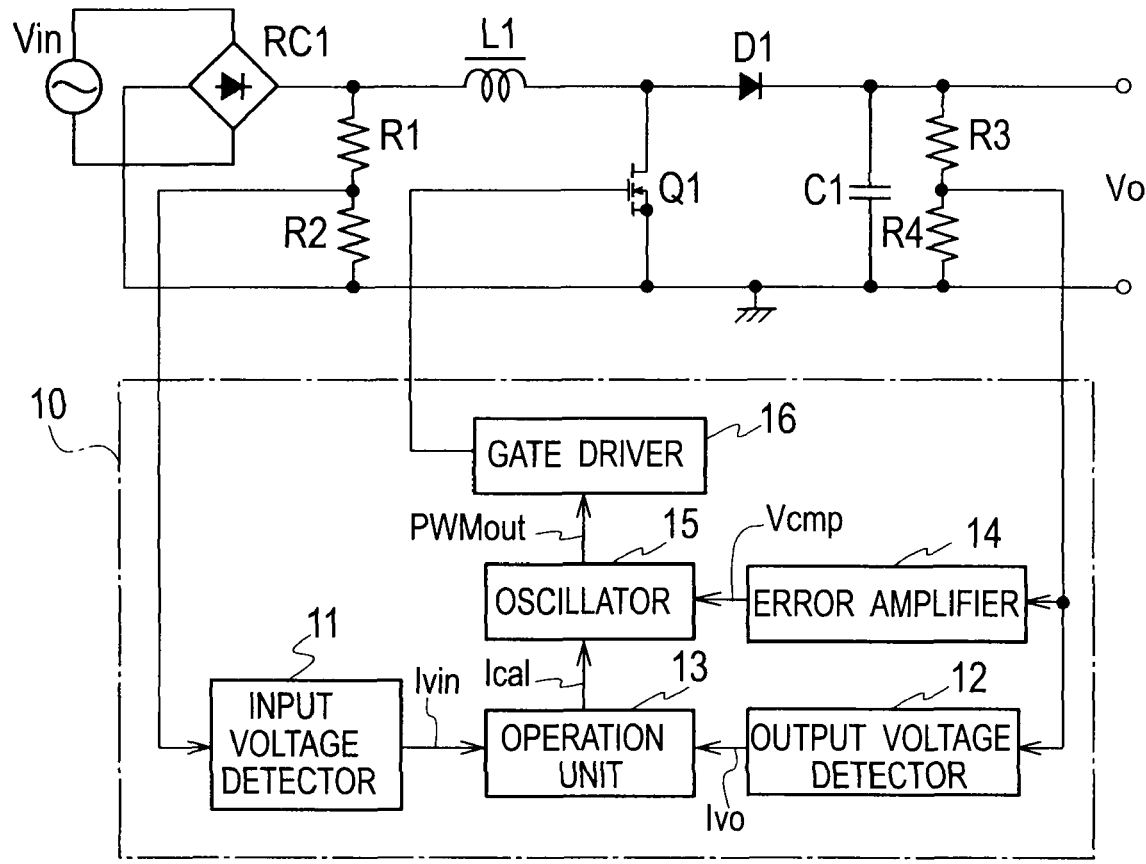
FIG. 4 is a circuit diagram illustrating a power factor correction circuit according to Embodiment 1 of the present invention.

FIG. 4 is a circuit diagram illustrating a power factor correction circuit according to Embodiment 1 of the present invention. The circuit includes a first rectifier RC1 to rectify and convert an AC voltage of an AC power source Vin into a DC voltage. An output of the first rectifier RC1 is connected to a series circuit including a step-up reactor L1 and a switching element Q1 made of an n-type MOSFET. Both ends of the switching element Q1 are connected in parallel with a rectifying-smoothing circuit including a second rectifier D1 and a smoothing capacitor C1. A voltage across the first rectifier RC1 is connected to a series circuit including resistors R1 and R2. Both ends of the smoothing capacitor C1 are connected to a series circuit including resistors R3 and R4.

A controller 10 controls an ON/OFF operation of the switching element Q1 and includes an input voltage detector 11, an output voltage detector 12, an operation unit 13, an error amplifier 14, an oscillator 15, and a gate driver 16.

The input voltage detector 11 is connected to a connection point of the resistors R1 and R2. An output voltage from the first rectifier RC1 is divided by the resistors R1 and R2 and the divided voltage is detected as an input voltage by the input voltage detector 11. The input voltage detector 11 generates a signal proportional to the detected voltage, converts the signal into a current signal, and outputs the current signal as an input voltage signal Ivin representing the output voltage of the first rectifier RC1 to the operation unit 13.

A voltage across the smoothing capacitor C1 is divided by the resistors R3 and R4 and the divided voltage is detected as an output voltage by the output voltage detector 12. The output voltage detector 12 generates a signal proportional to the detected voltage, converts the signal into a current signal, and outputs the current signal as an output voltage signal Ivo representing the voltage across the smoothing capacitor C1 to the operation unit 13. The error amplifier 14 amplifies an error between the divided voltage from the resistors R3 and R4 and a reference voltage Vref (not illustrated) and outputs an amplified error signal Vcmp to the oscillator 15.

The operation unit 13 carries out a calculation based on the input voltage signal Ivin from the input voltage detector 11 and the output voltage signal Ivo from the output voltage detector 12 and outputs a calculated signal Ical to the oscillator 15. According to the calculated signal Ical from the operation unit 13 and the amplified error signal Vcmp from the error amplifier 14, the oscillator 15 generates a pulse string signal indicating ON and OFF periods of the switching element Q1. Based on the pulse string signal from the oscillator 15, the gate driver 16 turns on/off the switching element Q1.

To stably operate the power factor correction circuit of FIG. 4, the ON time Ton and OFF time Toff of the switching element Q1 must be controlled to satisfy the following expression:

$$dI = \frac{V_{in} \cdot dT_{on}}{L1} = \frac{(V_o - V_{in}) \cdot dT_{off}}{L1}, \qquad (1)$$

where dI is a variation in current passing through the step-up reactor L1, L1 is an inductance value of the step-up reactor L1, Vin is an input voltage, dTon is an ON time of the switching element Q1, Vo is an output voltage, and dToff is a change in an OFF time of the switching element Q. When the relationship of the expression (1) is satisfied, energy accumulated in the step-up reactor L1 balances with energy discharged therefrom.

In the power factor correction circuit, the ON and OFF periods of the switching element Q1 are adjusted in such a way as to keep a current passing through the step-up reactor L1 at a boundary between continuous current and discontinuous current. If this condition is met, a switching loss that may occur when the switching element Q1 turns on and a recovery loss of the second rectifier D1 will be minimized.

The expression (1), however, will be satisfied even in a direct-current-superposed state of the step-up reactor L1 as well. To cope with this, the OFF period Toff of the switching element Q1 is slightly extended from the state satisfying the expression (1), so that a current passing through the step-up reactor L1 is surely kept at a boundary point, i.e., in a critical state between continuous current and discontinuous current. By doing so, an increase in current of the step-up reactor L1 during the ON period Ton of the switching element Q1 becomes smaller than a decrease in current to the step-up reactor L1 during the OFF period Toff of the switching element Q1. Then, even if the step-up reactor L1 is in a direct-current-superposed state, DC components will disappear and the critical state will be established.

Operation of the Controller

When a capacitor C is charged with a constant current, a voltage across the capacitor C is expressed as $$dV = \frac{I \cdot dT}{C}. \qquad (2)$$

This expression is applicable to express a change in current of the step-up reactor L1. Replacing dI in the expression (1) with dV, Vin with Ivin, (Vo−Vin) with (Ivo−Ivin), and L1 with Cramp provides the following expression:

$$dV = \frac{I_{Vin} \cdot dT_{on}}{C_{ramp}} = \frac{(I_{Vo} - I_{Vin})dT_{off}}{C_{ramp}}. \qquad (3)$$

The ON period Ton of the switching element Q1 is defined as a time period from when the capacitor Cramp is charged with the input voltage signal Ivin that is proportional to an input voltage detected by the input voltage detector 11 until when the voltage of the capacitor Cramp reaches the amplified error signal Vcmp. The OFF period of the switching element Q1 is defined as a period from when the capacitor Cramp charged during the ON period of the switching element Q1 is discharged with a differential current signal between the output voltage signal Ivo that is proportional to an output voltage detected by the output voltage detector 12 and the input voltage signal Ivin until when the capacitor Cramp is discharged to zero.

Controlling the switching element Q1 in such a way results in maintaining a constant output voltage and keeping a current passing through the step-up reactor L1 in the critical state, i.e., the boundary state between continuous current and discontinuous current.

This, however, is insufficient to improve a power factor because a current passing through the step-up reactor L1 is controlled to be constant with respect to the AC power source Vin that always varies. To improve the power factor, the expression (3) is divided by the input voltage signal Ivin proportional to an input voltage and is multiplied by a constant current Ibias as $$dV = I_{bias}\frac{dT_{on}}{C_{ramp}} = I_{bias} \cdot \frac{I_{Vo} - I_{Vin}}{I_{Vin}} \cdot \frac{dT_{off}}{C_{ramp}}. \qquad (4)$$

In the expression (4), dV is the amplified error signal Vcmp. The ON period of the switching element Q1 is a period from when the capacitor Cramp is charged with the constant current Ibias until when the voltage of the capacitor Cramp reaches the level of the amplified error signal Vcmp. The OFF period of the switching element Q1 is a period from when the capacitor Cramp charged during the ON period of the switching element Q1 is discharged with Ibias·(Ivo−Ivin)/Ivin until when the capacitor Cramp is discharged nearly to zero. Here, Ibias is the constant current, Ivo is the output voltage signal, and Ivin is the input voltage signal.

As mentioned above, the controller 10 determines the ON/OFF period of the switching element Q1 in such a way as to improve the power factor of an input current while keeping a current passing through the step-up reactor L1 in the critical state.

Figure 5:
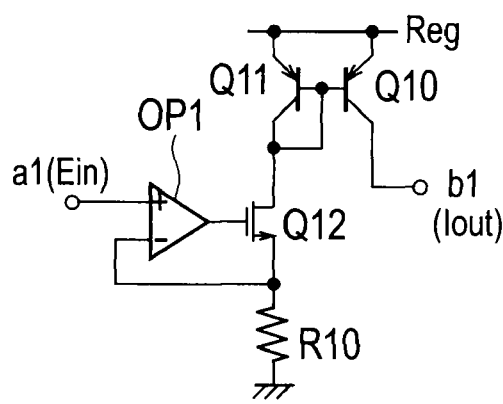
FIG. 5 is a circuit diagram illustrating a part of the power factor correction circuit of FIG. 4 serving as an input voltage detector or an output voltage detector.

FIG. 5 is a circuit diagram illustrating a part serving as anyone of the input voltage detector 11 and output voltage detector 12. An input signal Ein is passed through a terminal a1 to a non-inverting input terminal (depicted by "+") of an operational amplifier OP1. An output terminal of the operational amplifier OP1 is connected to a gate of a MOSFET Q12. An inverting input terminal (depicted by "−") of the operational amplifier OP1 is connected to a source of the MOSFET Q12 and a first end of a resistor R10. A second end of the resistor R10 is grounded.

A drain of the MOSFET Q12 is connected to a collector and base of a pnp-type transistor Q11 and a base of a pnp-type transistor Q10. Emitters of the transistors Q10 and Q11 are connected to a power source Reg. A collector of the transistor Q10 provides a terminal b1 with a current signal Iout.

The operational amplifier OP1, MOSFET Q12, and resistor R10 form a current source serving as a voltage/current converter. The transistors Q10 and Q11 form a current mirror circuit.

In any one of the input voltage detector 11 and output voltage detector 12 having the above-mentioned configuration, the divided input voltage signal Ein is supplied to the non-inverting input terminal of the operational amplifier OP1 and is converted by the voltage/current converter into a current signal. The current signal is outputted as the output current Iout from the collector of the transistor Q10 of the current mirror circuit.

Figure 6:
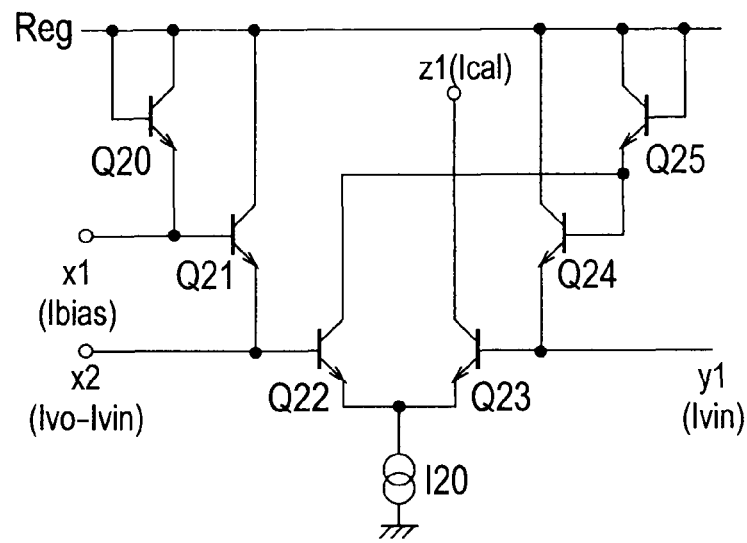
FIG. 6 is a circuit diagram illustrating an operation unit in the power factor correction circuit of FIG. 4.

FIG. 6 is a circuit diagram illustrating an example of the operation unit 13 arranged in the controller 10 of FIG. 4. A base and collector of a transistor Q20 are connected to the power source Reg and an emitter of the transistor Q20 is connected to an input terminal x1 and a base of a transistor Q21. A collector of the transistor Q21 is connected to the power source Reg and an emitter thereof is connected to an input terminal x2 and a base of a transistor Q22. An emitter of the transistor Q22 is connected to an emitter of a transistor Q23 and a first end of a current source I20. A collector of the transistor Q22 is connected to a base of a transistor Q24 and an emitter of a transistor Q25.

A base of the transistor Q23 is connected to an input terminal y1 and an emitter of the transistor Q24. A collector of the transistor Q23 is connected to an output terminal z1. A collector of the transistor Q24 is connected to the power source Reg. A base and collector of the transistor Q25 are connected to the power source Reg. The transistors Q20, Q21, Q22, Q23, Q24, and Q25 each is an npn-type transistor and each forms a multiplying-dividing circuit.

The input terminal x1 receives the constant current Ibias. The input terminal x2 receives a current signal obtained by subtracting the input voltage signal Ivin from the output voltage signal Ivo. The input terminal y1 receives the input voltage signal Ivin. The output terminal z1 outputs a calculation result Ical to operation of Ibias·(Ivo−Ivin)/Ivin.

The current signal provided from the output terminal z1 is controlled to be equal to or lower than a bias current of the current source I20.

Figure 7:
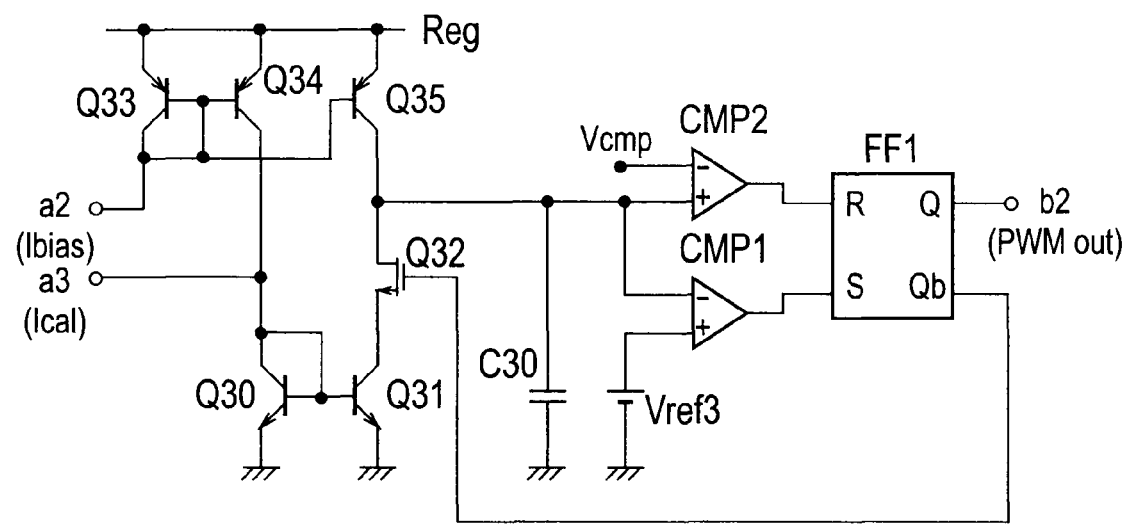
FIG. 7 is a circuit diagram illustrating an oscillator in the power factor correction circuit of FIG. 4.

FIG. 7 is a circuit diagram illustrating an example of the oscillator 15 arranged in the controller 10 of FIG. 4. Emitters of transistors Q33, Q34, and Q35 are connected to the power source Reg. A base and collector of the transistor Q33 and bases of the transistors Q34 and Q35 are connected to a terminal a2. The terminal a2 receives the constant current Ibias.

A terminal a3 receives the calculated signal Ical and is connected to a collector of the transistor Q34, a collector and base of a transistor Q30, and a base of a transistor Q31. An emitter of the transistor Q30 is grounded.

A collector of the transistor Q35 is connected to a drain of a MOSFET Q32, a source of the MOSFET Q32 is connected to a collector of the transistor Q31, and an emitter of the transistor Q31 is grounded. A connection point of the collector of the transistor Q35 and the drain of the MOSFET switching element Q32 is connected to a first end of a capacitor C30, a non-inverting input terminal (depicted by "+") of a comparator CMP2, and an inverting input terminal (depicted by "−") of a comparator CMP1.

A non-inverting input terminal (depicted by "+") of the comparator CMP1 receives a reference voltage Vref 3. An inverting input terminal (depicted by "−") of the comparator CMP2 receives the amplified error signal Vcmp. A flip-flop FF1 has a terminal R to receive an output from the comparator CMP2, a terminal S to receive an output from the comparator CMP1, and an output terminal Q to output a pulse string signal PWMout to a terminal b2. The flip-flop FF1 also has an inverting output terminal Qb with respect to the output terminal Q, the terminal Qb being connected to a gate of the MOSFET Q32.

The npn-type transistors Q30 and Q31 form a current mirror circuit. The pnp-type transistors Q33, Q34, and Q35 form two-output current mirror circuits.

Operation of the oscillator 15 of FIG. 7 will be explained with reference to the timing chart of FIG. 8.

The constant current Ibias is passed through the terminal a2 to the base and collector of the transistor Q33, the base of the transistor Q34, and the base of the transistor Q35. The collector of the transistor Q34 provides an output of the mirror circuit. This output current is added to the calculation result Ical supplied from the operation unit 13 through the terminal a3 and the sum is supplied to an input terminal of the current mirror circuit having the transistors Q30 and Q31.

When the MOSFET Q32 turns off, a current from the transistor Q35 charges the capacitor C30. When the MOSFET Q32 turns on, the capacitor C30 is discharged. The capacitor C30 acts as Cramp of the expression (4).

When the flip-flop FF1 is set, the output terminal Q thereof provides a high-level output and the output terminal Qb thereof provides a low-level output. With the output terminal Qb of low level, the MOSFET Q32 turns off and the capacitor C30 is charged with the constant current Ibias. The voltage of the capacitor C30 linearly increases at an inclination of Ibias from time t1 as illustrated in FIG. 8.

Figure 8:
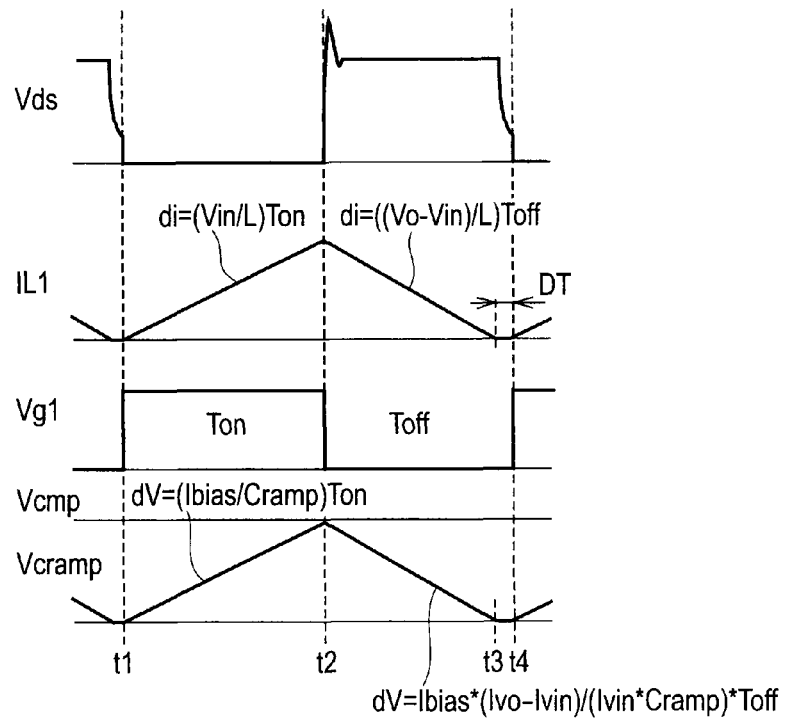
FIG. 8 is a timing chart illustrating operation of the power factor correction circuit of FIG. 4.

The voltage of the capacitor C30 reaches the amplified error signal Vcmp at time t2 as illustrated in FIG. 8. Then, the comparator CMP2 provides a high-level output to reset the flip-flop FF1. The output terminal Q of the flip-flop FF1 provides a low-level output and the output terminal Qb thereof provides a high-level output.

In response to the high-level output from the output terminal Qb of the flip-flop FF1, the MOSFET Q32 turns on and the capacitor C30 is discharged with Ibias·(Ivo−Ivin)/Ivin. The capacitor C30 is discharged down to the reference power source Vref3 at time t3. Then, the comparator CMP1 provides a high-level output to set the flip-flop FF1. The oscillator 15 repeats these actions to generate a pulse string signal.

In a period from t1 to t2, the flip-flop FF1 provides a high-level output from the output terminal Q so that a drive signal Vg1 for driving the gate of the switching element Q1 becomes of high level. In a period from t2 to t3, the flip-flop FF1 provides a low-level output from the output terminal Q so that the drive signal Vg1 becomes of low level. In synchronization with the pulse string signal from the oscillator 15, the gate driver 16 turns on/off the switching element Q1.

As illustrated in FIG. 8, the controller 10 turns on the switching element Q1 when a predetermined time (dead time D) passes after time t3 at which a result of the calculation carried out on the input voltage signal and output voltage signal decreases to a predetermined value during an OFF period of the switching element Q1. This technique keeps a current passing through the step-up reactor L1 in a critical state and minimizes a switching loss when the switching element Q1 turns on and a recovery loss of the diode D1.

In FIG. 8, Vds is a drain-source voltage of the switching element Q1, IL1 is a current passing through the step-up reactor L1, Vg1 is a drive signal provided by the gate driver 16 for driving the switching element Q1, Vcramp is a voltage across the capacitor C30, and Vcmp is an amplified error signal provided by the error amplifier 14.

Figure 9:
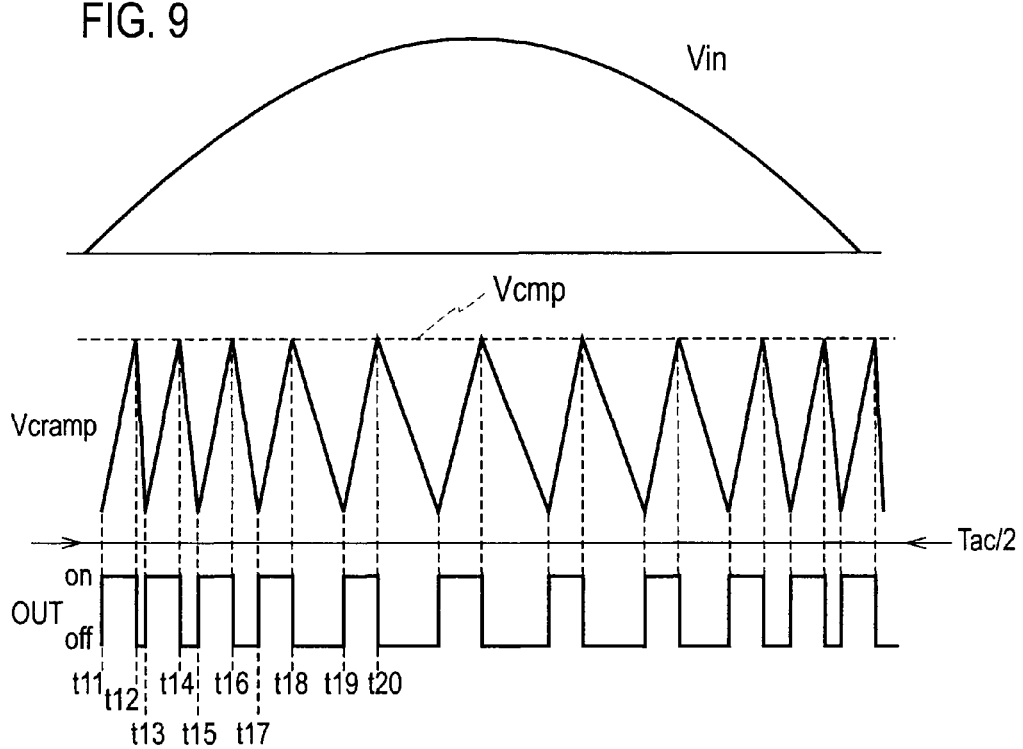
FIG. 9 is a timing chart illustrating a pulse string signal generated by the oscillator of FIG. 7 in a half cycle of an AC power source.

FIG. 9 is a timing chart illustrating changes in the pulse string signal generated by the oscillator 15 in a half cycle of the AC power source Vin. An upper limit value of the voltage Vcramp across the capacitor C30 is defined by the amplified error signal Vcmp. The ON time of the switching element Q1 is unchanged with respect to changes in the AC power source Vin. On the other hand, the OFF time of the switching element Q1 is changed in response to changes in the AC power source Vin such that the OFF time is extended when the input voltage Vin is large and is shortened when the input voltage Vin is small.

Figure 10:
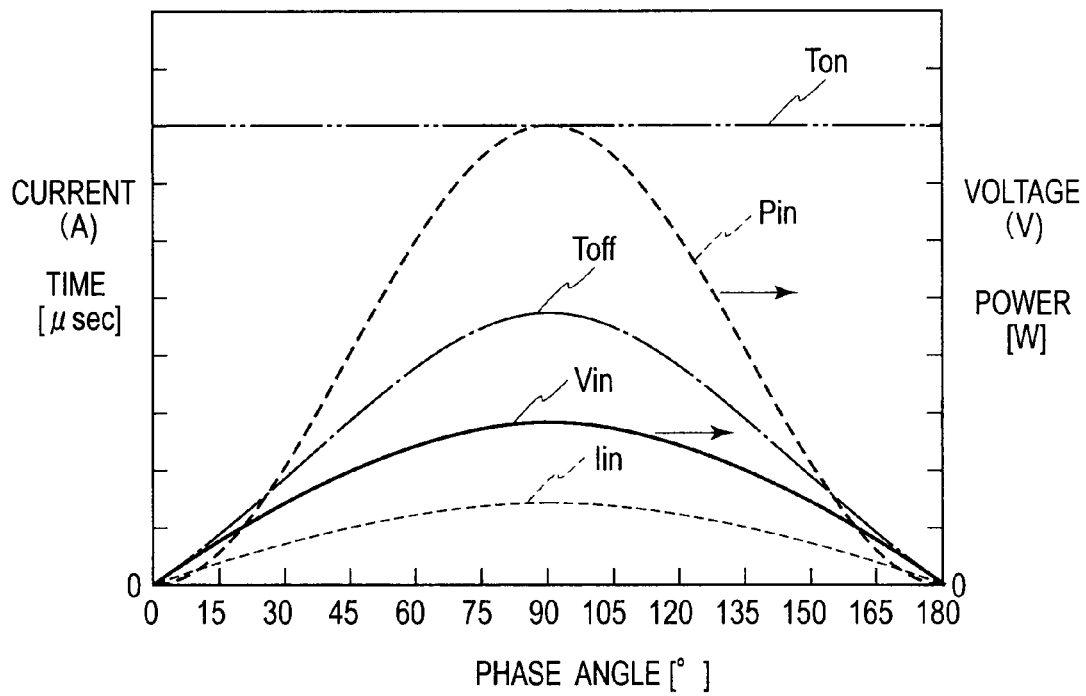
FIG. 10 is a graph illustrating control characteristics of the power factor correction circuit of FIG. 4 in a manner of a critical type.

FIG. 10 illustrates control characteristics of the critical-type power factor correction circuit. In FIG. 10, Ton is the ON time of the switching element Q1, Toff is the OFF time of the switching element Q1, Vin is an input voltage, Iin is an input current, and Pin is input power. An abscissa indicates a phase angle of the AC power source Vin, a left ordinate indicates a current and time, and a right ordinate indicates a voltage and power.

As is apparent in FIG. 10, the input power changes in response to changes in the input voltage. The ON time Ton is unchanged. The OFF time Toff changes in response to the input voltage. This control technique is capable of keeping a current passing through the step-up reactor L1 in a critical state and correcting a power factor.

Although the current Ibias is constant in Embodiment 1, it may be changed in response to the amplified error signal Vcmp or any other external signals. The capacitor Cramp may be discharged in the ON period of the switching element Q1 and charged in the OFF period thereof. The capacitor Cramp may temporarily be discharged (or charged) when the ON and OFF periods of the switching element Q1 are switched from one to another and may be charged (or discharged) in synchronization with each ON period of the switching element Q1.

Figure 3:
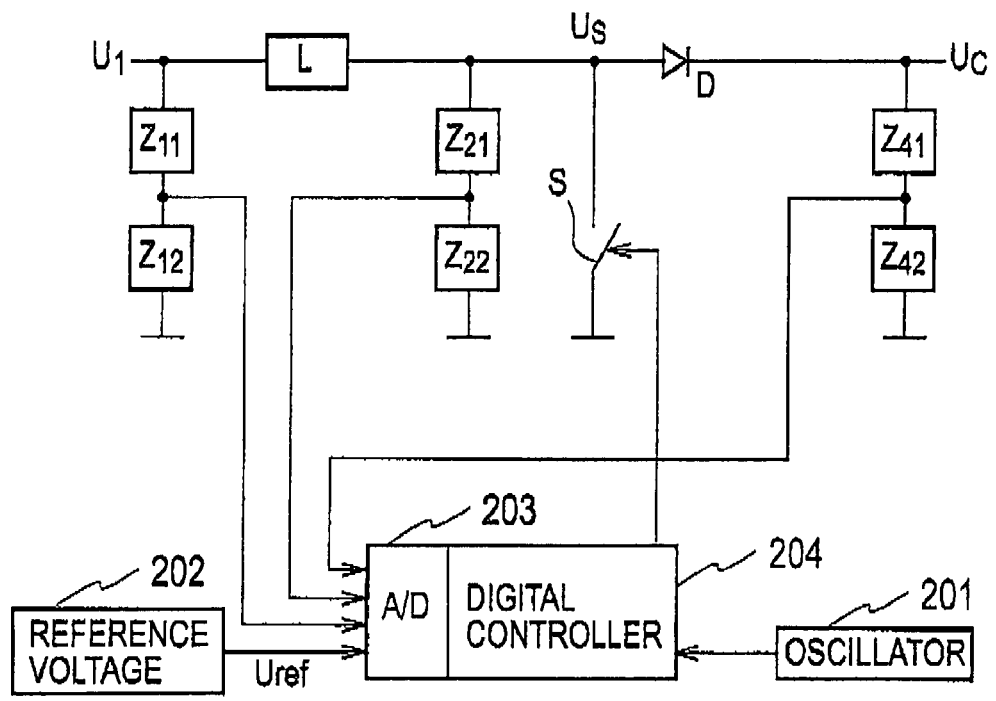
FIG. 3 is a circuit diagram illustrating a power factor correction circuit according to a second related art.

The second related art illustrated in FIG. 3 employs digital signals, and therefore, discretely holds an ON time and calculates an OFF time according to the ON time and an input voltage. If the input voltage varies, the discrete control is unable to follow the variation when calculating an OFF time.

Then, the calculated OFF time may involve an error with respect to the variation in the input voltage.

For this, Embodiment 1 employs analog signals to achieve continuous control that can change an OFF time in response to variations in an input voltage. Accordingly, Embodiment 1 causes no error in a calculated OFF time with respect to variations in an input voltage.

Embodiment 2

Figure 11:
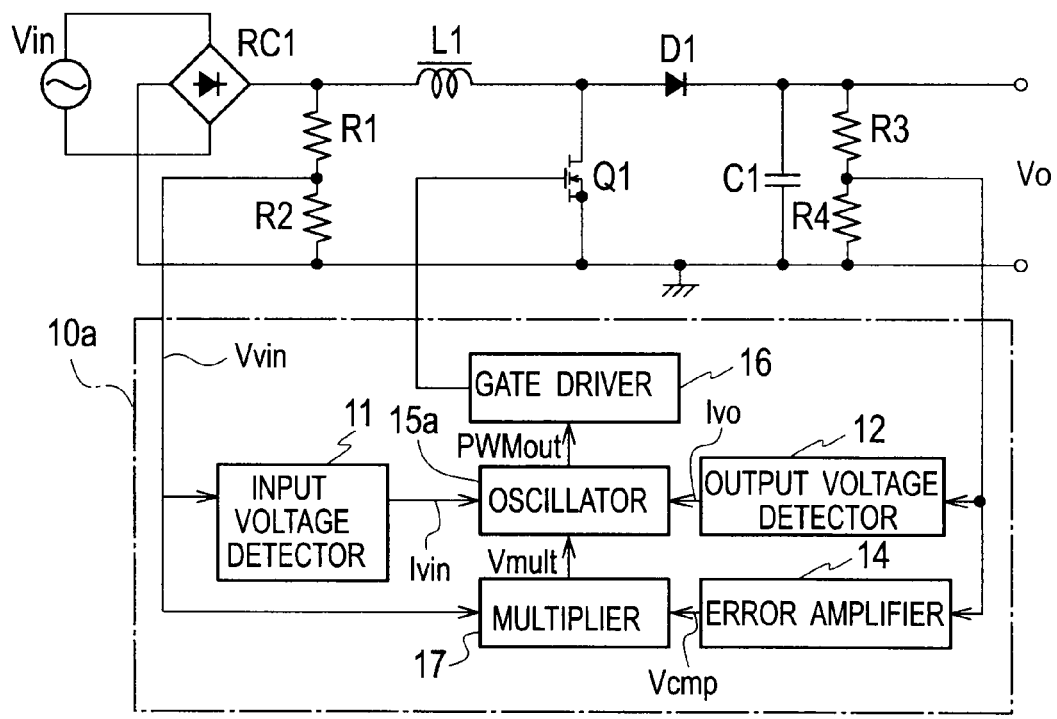
FIG. 11 is a circuit diagram illustrating a power factor correction circuit according to Embodiment 2 of the present invention.

FIG. 11 is a circuit diagram illustrating a power factor correction circuit according to Embodiment 2 of the present invention. Embodiment 2 differs from Embodiment 1 in that it employs a control circuit 10a of different configuration. Accordingly, only the control circuit 10a will be explained.

In FIG. 11, the control circuit 10a includes an input voltage detector 11, an output voltage detector 12, an error amplifier 14, an oscillator 15a, a gate driver 16, and a multiplier 17.

The input voltage detector 11 converts a divided input voltage signal Vvin into an input voltage signal Ivin and provides the oscillator 15a with the input voltage signal Ivin. Here, the divided input voltage signal Vvin is obtained by dividing an output voltage of a first rectifier RC1 by resistors R1 and R2. The input voltage signal Ivin is a current signal proportional to the output voltage of the first rectifier RC1. The divided input voltage signal Vvin is also supplied to the multiplier 17. The output voltage detector 12 provides the oscillator 15a with an output voltage signal Ivo, which is obtained by dividing a voltage across a smoothing capacitor C1 by resistors R3 and R4 and by converting the divided voltage into a current.

The error amplifier 14 receives the voltage obtained by dividing a voltage across the smoothing capacitor C1 by the resistors R3 and R4 and a reference voltage Vref (not illustrated), finds a difference between them, amplifies the difference, and provides the multiplier 17 with an amplified error signal Vcmp. The multiplier 17 multiplies the amplified error signal Vcmp by the divided input voltage signal Vvin and provides the oscillator 15a with a multiplied signal Vmult. According to the input voltage signal Ivin, output voltage signal Ivo, and multiplied signal Imult, the oscillator 15a generates a pulse string signal PWMout and provides the gate driver 16 with the pulse string signal PWMout. In synchronization with the pulse string signal PWMout, the gate driver 16 provides the switching element Q1 with a drive signal.

Embodiment 2 differs from Embodiment 1 in the configuration of the oscillator 15a. According to Embodiment 1, the oscillator 15 compares the expression (4) with the amplified error signal Vcmp and determines the ON/OFF timing of the switching element Q1. According to the present embodiment, the oscillator 15a compares Ivin of the expression (3) with the multiplied signal Vmult obtained by multiplying the amplified error signal Vcmp by the divided input voltage signal Vvin and determines the ON/OFF timing of the switching element Q1.

Figure 12:
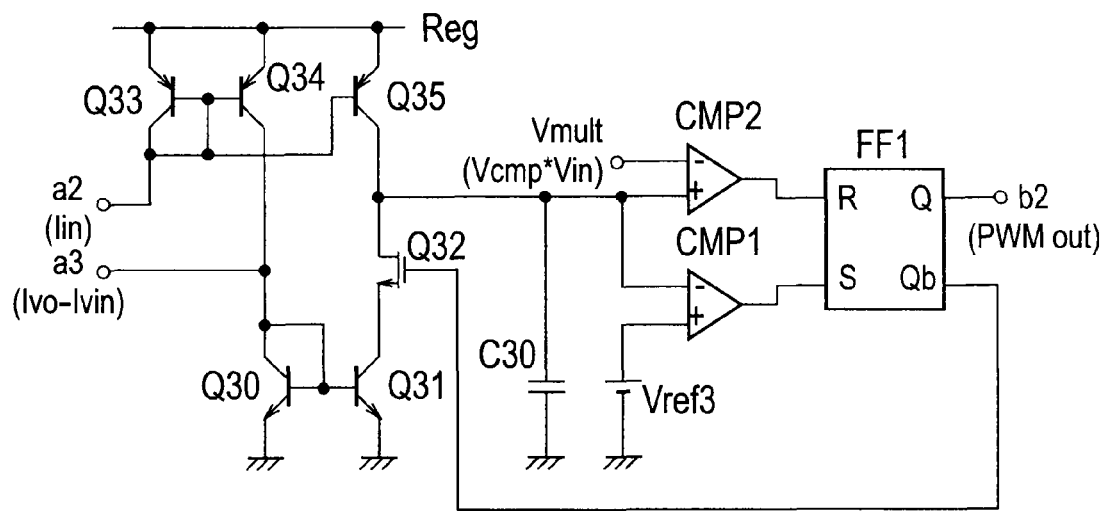
FIG. 12 is a circuit diagram illustrating an oscillator in the power factor correction circuit of FIG. 11.

FIG. 12 is a circuit diagram illustrating an example of the oscillator 15a according to Embodiment 2. Although the circuit structure of the oscillator 15a of Embodiment 2 is the same as that of the oscillator 15 of Embodiment 1 (FIG. 7), signals received by the oscillator 15a of Embodiment 2 are different from those received by the oscillator 15 of Embodiment 1.

In FIG. 12 of Embodiment 2, a terminal a2 of a two-output current mirror circuit including transistors Q33, Q34, and Q35 receives the input voltage signal Ivin instead of the constant current Ibias. An input terminal a3 of a current mirror circuit including transistors Q30 and Q31 receives input/output voltage difference signal Ivo−Ivin instead of the calculation result Ical (=Ibias·(Ivo−Ivin)/Ivin). An inverting input terminal of a comparator CMP2 receives the multiplied signal Vmult (=Vcmp·Vvin) from the multiplier 17 instead of the amplified error signal Vcmp. The remaining configuration of Embodiment 2 is the same as that of Embodiment 1.

When a flip-flop FF1 is set in FIG. 12, a MOSFET Q32 is OFF, and therefore, a capacitor C30 is charged with the input voltage signal Ivin.

When the flip-flop FF1 is reset, the MOSFET Q32 is ON, and therefore, the capacitor C30 is discharged with the input/output voltage difference signal of (Ivo−Ivin). The timing when the capacitor C30 switches from charging to discharging is proportional to the multiplied signal Vmult supplied to the inverting input terminal of the comparator CMP2.

In this way, the oscillator 15a generates the pulse string signal PWMout and provides the gate driver 16 with the pulse string signal PWMout. In synchronization with the pulse string signal PWMout, the gate driver 16 turns on/off the switching element Q1, to realize the critical-type power factor correction circuit.

Figure 13:
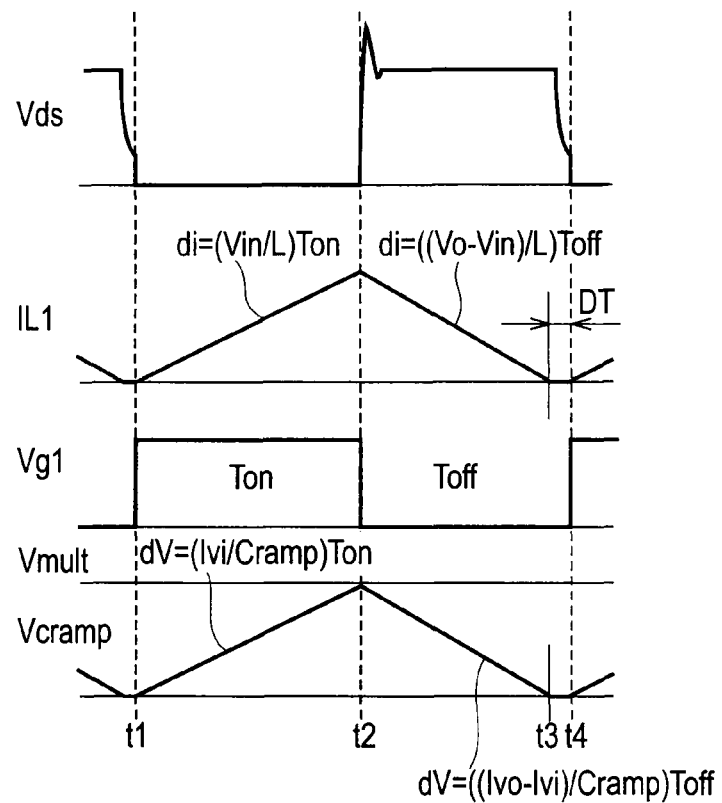
FIG. 13 is a timing chart illustrating operation of the power factor correction circuit of FIG. 11.

FIG. 13 is a timing chart illustrating operation of the power factor correction circuit according to Embodiment 2. In FIG. 13, Vds is a drain-source voltage of the switching element Q1, IL1 is a current passing through a step-up reactor L1, Vg1 is a drive signal provided by the controller 10a for driving the switching element Q1, Vcramp is a voltage across the capacitor C30, and Vmult is a result of multiplying the amplified error signal Vcmp by the divided input voltage signal Vvin.

In this way, the power factor correction circuit according to the present embodiment detects an input voltage and an output voltage and charges/discharges the capacitor C30 with a current signal proportional to the detected input voltage and output voltage. This configuration eliminates an auxiliary winding from the step-up reactor L1, reduces the cost of the circuit, and makes it easy to design the circuit.

Figure 1:
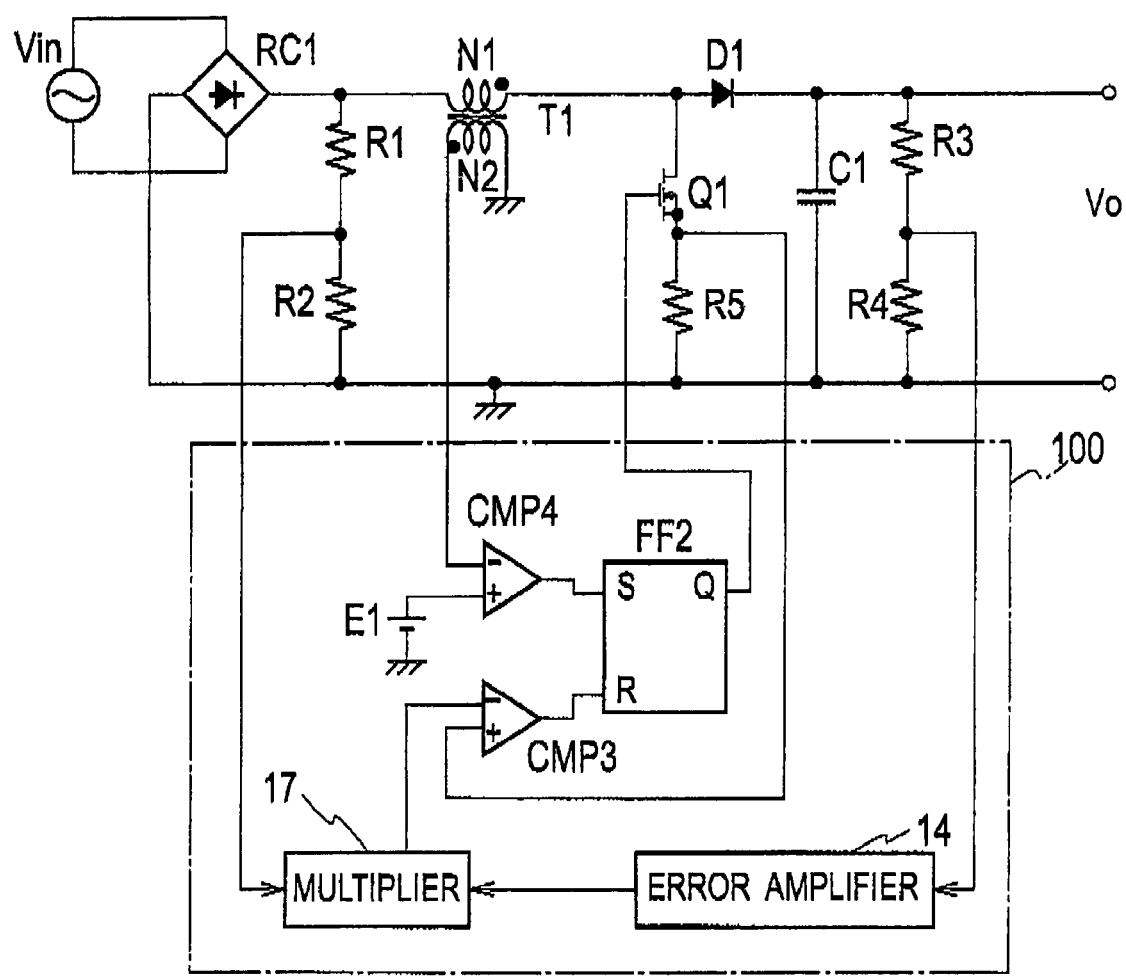
FIG. 1 is a circuit diagram illustrating a power factor correction circuit according to a first related art.
Figure 2:
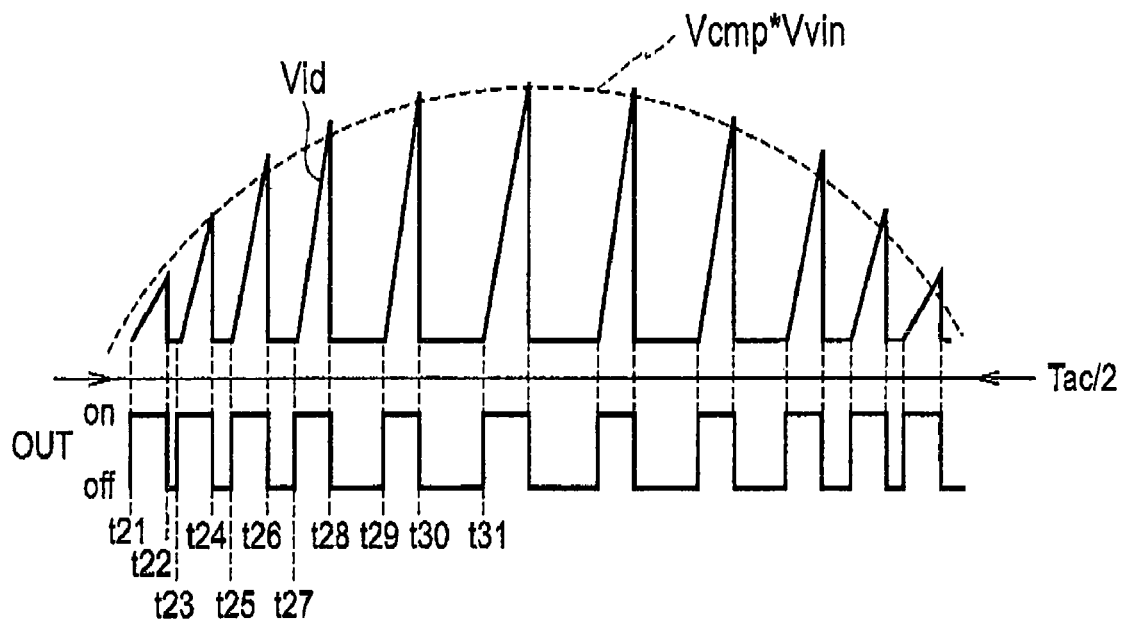
FIG. 2 is a timing chart illustrating operation of the power factor correction circuit of FIG. 1.

Unlike the first related art of FIG. 1 that should employ the auxiliary winding for the step-up reactor, and therefore, has a risk of causing an abnormal state such as a short circuit of the auxiliary winding, Embodiment 2 employs no auxiliary winding, and therefore, never causes such an abnormal state.

Embodiment 3

Figure 14:
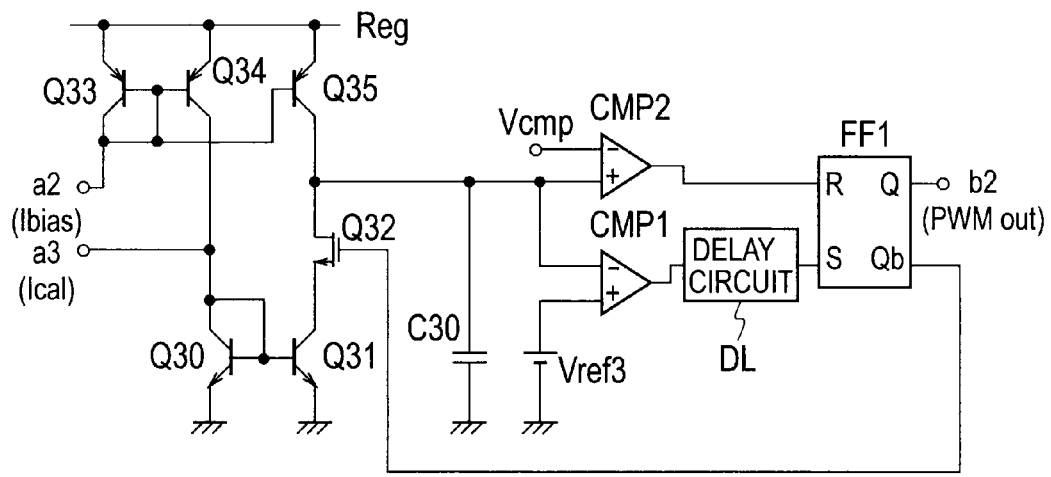
FIG. 14 is a circuit diagram illustrating an oscillator according to Embodiment 3 of the present invention applicable to a power factor correction circuit.

FIG. 14 is a circuit diagram illustrating an oscillator according to Embodiment 3 applicable to the power factor correction circuit of Embodiment 1. Compared with the oscillator according to Embodiment 1 illustrated in FIG. 7, the oscillator of FIG. 14 additionally has a delay circuit DL between an output terminal of a comparator CMP1 and a set terminal S of a flip-flop FF1. The delay circuit DL delays a signal from the comparator CMP1 by a predetermined time, to extend an OFF time of a switching element Q1 by the predetermined time.

Figure 15:
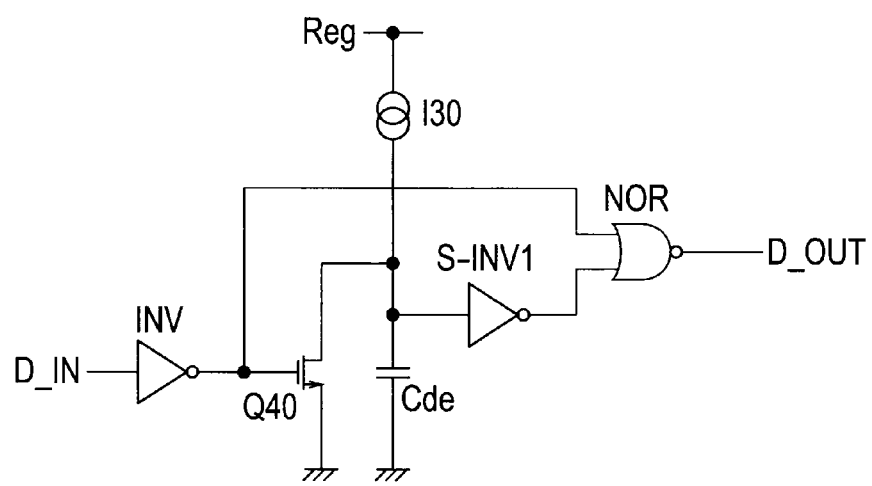
FIG. 15 is a circuit diagram illustrating a delay circuit arranged in the oscillator of FIG. 14.

FIG. 15 illustrates an example of the delay circuit DL arranged in the oscillator of FIG. 14. In FIG. 15, an input terminal of an inverter INV is connected to the output terminal of the comparator CMP1 and an output terminal of the inverter INV is connected to a gate of a MOSFET Q40 and an input terminal of a NOR gate NOR.

A drain of the MOSFET Q40 is connected to a first end of a current source I30, a first end of a capacitor Cde, and an input terminal of a Schmitt inverter S-INV1. A second end of the current source I30 is connected to a power source Reg. A second end of the capacitor Cde and a source of the MOSFET Q40 are grounded.

An output terminal of the Schmitt inverter S-INV1 is connected to an input terminal of the NOR gate NOR. An output terminal of the NOR gate NOR is connected to the set terminal S of the flip-flop FF1.

If the comparator CMP1 provides a low-level output, the inverter INV inverts the same into a high-level signal to turn on the MOSFET Q40. Then, the Schmitt inverter S-INV1 receives a low-level signal, and therefore, provides a high-level output. The NOR gate NOR receives the high-level signals from the inverter INV and Schmitt inverter S-INV1, and therefore, provides a low-level output.

If the comparator CMP1 provides a high-level output, the inverter INV provides a low-level signal to turn off the MOSFET Q40. Then, the capacitor Cde is charged with a current provided by the current source I30. When the voltage of the capacitor Cde reaches a threshold voltage of the Schmitt inverter S-INV1, the Schmitt inverter S-INV1 provides a low-level output. The NOR gate NOR receives the low-level signals from the inverter INV and Schmitt inverter S-INV1 and provides a high-level output. Namely, the high-level output from the comparator CMP1 is delayed by a period from when the high-level output of the comparator CMP1 is supplied to the inverter INV to when the voltage of the capacitor Cde reaches the threshold voltage of the Schmitt inverter S-INV1. Thereafter, the delayed high-level signal is supplied to the set terminal S of the flip-flop FF1. As results, an OFF time of the switching element Q1 is extended by the predetermined period.

In summary, the controller of the power factor correction circuit according to any one of the embodiments of the present invention carries out a calculation on an input voltage signal from the input voltage detector and an output voltage signal from the output voltage detector, provides an amplified error signal from the error amplifier, finds a critical point to zero a current passing through the step-up reactor according to the calculation result and amplified error signal, and determines ON and OFF periods of the switching element. With this control, the power factor correction circuit carries out a critical operation without an auxiliary winding, to reduce the cost thereof.

According to the second aspect of the present invention, the oscillator (signal generator) sets an ON time of the switching element in proportion to the amplified error signal and an OFF time thereof based on a comparison between the calculation result and the amplified error signal and generates a pulse string signal specifying the ON/OFF time of the switching element. With this operation, the power factor correction circuit carries out a critical operation to zero a current passing through the step-up reactor without an auxiliary winding. The power factor correction circuit, therefore, is manufacturable at low cost.

According to the third aspect of the present invention, the oscillator (signal generator) sets an ON time of the switching element based on a comparison between an integrated value of the input voltage signal and the calculation result, sets an OFF time thereof based on a comparison between the calculation result and an integrated value of differences between the output voltage signal and the input voltage signal, and generates a pulse string signal specifying the ON/OFF time of the switching element. With this operation, the power factor correction circuit carries out a critical operation to zero a current passing through the step-up reactor without an auxiliary winding. The power factor correction circuit, therefore, is manufacturable at low cost.

According to another aspect of the present invention, the controller of the power factor correction circuit turns on the switching element a predetermined time after a critical point at which a current passing through the step-up reactor becomes zero. Accordingly, the current passing through the step-up reactor is stably maintained in a critical state. This control minimizes a switching loss when the switching element turns on and a recovery loss of the second rectifier.

According to still another aspect of the present invention, the controller of the power factor correction circuit determines an ON time and OFF time of the switching element by charging and discharging a capacitor. This control realizes a critical state to zero a current passing through the step-up reactor without an auxiliary winding and corrects a power factor at low cost.

This application claims benefit of priority under 35 USC §119 to Japanese Patent Application No. 2008-134539, filed on May 22, 2008, the entire content of which is incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A power factor correction circuit comprising:
 a first rectifier configured to rectify and convert an AC voltage into a DC voltage;
 a series circuit connected to an output o the first rectifier and including a step-up reactor and a switching element;
 a rectifying-smoothing circuit connected to both ends of the switching element and including a second rectifier and a smoothing capacitor;
 an input voltage detector configured to detect an output voltage of the first rectifier and provide an input voltage signal representing the detected voltage;
 an output voltage detector configured to detect a voltage across the smoothing capacitor and provide an output voltage signal representing the detected voltage;
 an error amplifier configured to amplify an error between the output voltage signal and a reference voltage and provide an amplified error signal; and
 a controller configured to determine an ON/OFF duty ration of the switching element, wherein the controller includes,
  an operation unit configured to provide the result of a calculation carried out on the input voltage signal and output voltage signal, and
  a signal generator configured to set an ON time of the switching element in proportion to the amplified error signal, set an OFF time of the switching element based on a comparison between the result of the calculation and the amplified error signal, and provide a pulse string signal specifying the set ON time and OFF time.

2. A power factor correction circuit comprising:
 a first rectifier configured to rectify and convert an AC voltage into a DC voltage;
 a series circuit connected to an output o the first rectifier and including a step-up reactor and a switching element;
 a rectifying-smoothing circuit connected to both ends of the switching element and including a second rectifier and a smoothing capacitor;
 an input voltage detector configured to detect an output voltage of the first rectifier and provide an input voltage signal representing the detected voltage;
 an output voltage detector configured to detect a voltage across the smoothing capacitor and provide an output voltage signal representing the detected voltage;

an error amplifier configured to amplify an error between the output voltage signal and a reference voltage and provide an amplified error signal; and a controller configured to determine an ON/OFF duty ration of the switching element, wherein the controller includes, an operation unit configured to provide the result of a calculation carried out on the input voltage signal and the amplified error signal, and a signal generator configured to set an ON time of the switching element based on a comparison between an integrated value of the input voltage signal and the result of the calculation, set an OFF time of the switching element based on a comparison between the result of the calculation and an integrated value of differences between the output voltage signal and the input voltage signal, and provide a pulse string signal specifying the set ON time and OFF time.

3. The power factor correction circuit of claim 1, wherein the controller extends the OFF time of the switching element by a predetermined period when setting the OFF time.

4. The power factor correction circuit of claim 1, wherein the controller extends the OFF time of the switching element by a predetermined period when setting the OFF time.

5. The power factor correction circuit of claim 1, wherein the controller determines the ON time and OFF time of the switching element by charging and discharging a capacitor.

6. The power factor correction circuit of claim 2, wherein the controller determines the ON time and OFF time of the switching element by charging and discharging a capacitor.

* * * * *